United States Patent
Kuhl

(10) Patent No.: US 11,774,953 B2
(45) Date of Patent: Oct. 3, 2023

(54) METHOD FOR CHECKING THE SETTING OF PREDEFINED SECURITY FUNCTIONS OF A FIELD DEVICE IN PROCESS AND AUTOMATION ENGINEERING

(71) Applicant: Endress+Hauser Wetzer GmbH+Co. KG, Nesselwang (DE)

(72) Inventor: Michael Kuhl, Haldenwang (DE)

(73) Assignee: Endress+Hauser Wetzer GmbH+Co. KG, Nesselwang (DE)

( * ) Notice: Subject to any disclaimer, the term of this patent is extended or adjusted under 35 U.S.C. 154(b) by 306 days.

(21) Appl. No.: 17/101,190

(22) Filed: Nov. 23, 2020

(65) Prior Publication Data

US 2021/0157306 A1    May 27, 2021

(30) Foreign Application Priority Data

Nov. 25, 2019  (DE) .................... 10 2019 131 833.5

(51) Int. Cl.
  *G06F 21/00*  (2013.01)
  *G05B 19/418*  (2006.01)
  (Continued)

(52) U.S. Cl.
  CPC ... *G05B 19/41885* (2013.01); *G05B 19/4183* (2013.01); *G06F 16/9035* (2019.01);
  (Continued)

(58) Field of Classification Search
  CPC .......... G05B 19/41885; G05B 19/4183; G05B 19/4186; G05B 2219/32252;
  (Continued)

(56) References Cited

U.S. PATENT DOCUMENTS 7,941,858 B2 * 5/2011 Talanis .................... H04L 67/02
                                                     726/10
2005/0044410 A1 * 2/2005 Yan ...................... G06Q 20/382
                                                     726/4
(Continued)

FOREIGN PATENT DOCUMENTS

DE        102018124251 A1    4/2019

*Primary Examiner* — Jeffrey C Pwu
*Assistant Examiner* — Helai Salehi
(74) *Attorney, Agent, or Firm* — Mark A. Logan; Endress+Hauser (USA) Holding, Inc.

(57) ABSTRACT

Disclosed is a method for checking the setting of predefined security functions of a field device of process and automation technology, wherein the predefined security functions relate to an access to a function of the field device by an unauthorized person. The method includes: identifying a user; starting by the user a query about the actual setting of the security functions predefined at the measuring point; comparing actual setting of the predefined security functions with a target setting of the predefined security functions defined by the stipulated security level; and outputting an electronic report about the matching or deviation of the actual setting from the target setting of the predefined security functions. Depending on the matching or deviation of the actual setting from the target setting of the predefined security functions, different steps are carried out.

12 Claims, 1 Drawing Sheet

(51) Int. Cl.
    *H04W 12/06*      (2021.01)
    *G06F 16/9035*    (2019.01)
    *H04W 12/69*      (2021.01)
    *H04L 9/40*       (2022.01)

(52) U.S. Cl.
    CPC ............. *H04L 63/20* (2013.01); *H04W 12/06* (2013.01); *H04W 12/69* (2021.01)

(58) Field of Classification Search
    CPC ..... G06F 16/9035; H04L 63/20; H04L 63/08; H04W 12/06; H04W 12/69
    See application file for complete search history.

(56)                References Cited

U.S. PATENT DOCUMENTS

2008/0301814 A1*  12/2008  Takahashi ............... G06F 21/70
                                                            726/25
2019/0139351 A1*  5/2019   Chambero ......... G06Q 20/3227

* cited by examiner

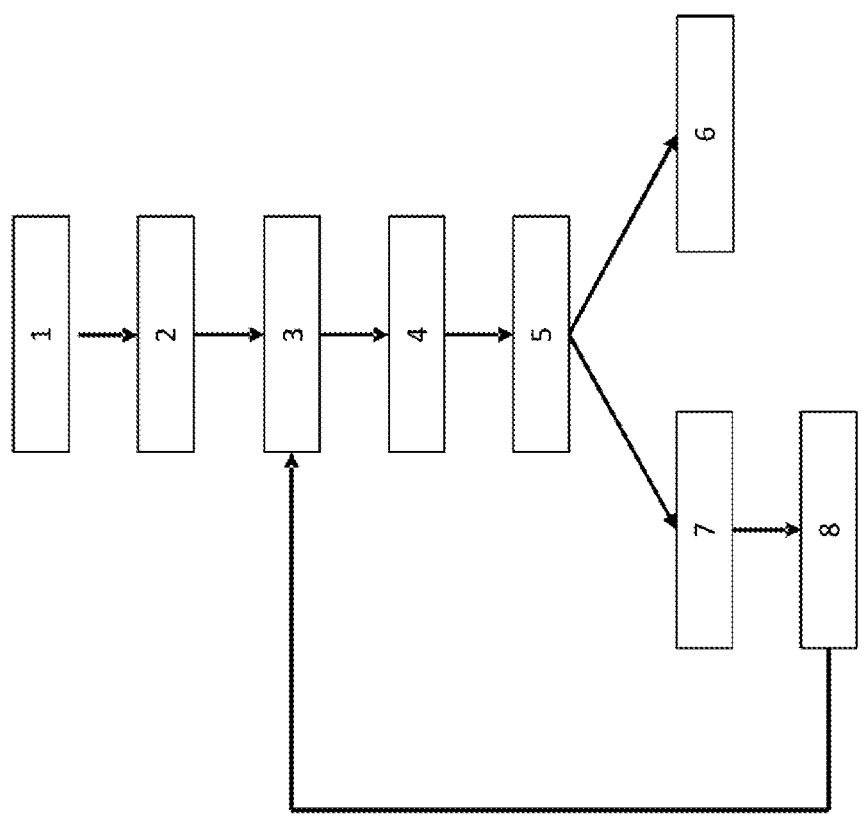

METHOD FOR CHECKING THE SETTING OF PREDEFINED SECURITY FUNCTIONS OF A FIELD DEVICE IN PROCESS AND AUTOMATION ENGINEERING

CROSS-REFERENCE TO RELATED APPLICATION

The present application is related to and claims the priority benefit of German Patent Application No. 10 2019 131 833.5, filed on Nov. 25, 2019, the entire contents of which are incorporated herein by reference.

TECHNICAL FIELD

The present disclosure relates to a method for checking the setting of predefined security functions of a field device in process and automation engineering, wherein the predefined security functions relate in particular to an access to at least one function of the field device by an unauthorized person.

BACKGROUND

Various field devices that are used in industrial installations are already known from the prior art. Field devices are often used in process automation, as well as in manufacturing automation.

Field devices, in general, refer to all devices which are used on the plant floor and which acquire and/or process process-relevant information. Field devices are used to determining and/or influence process variables. Measuring devices, or sensors, are used for determining process variables. These are used, for example, for pressure and temperature measurement, conductivity measurement, flow measurement, pH measurement, fill-level measurement, etc., and detect the corresponding process variables of pressure, temperature, conductivity, pH value, fill level, flow, etc. Actuators are used for influencing process variables. These are, for example, pumps or valves that can influence the flow of a fluid in a pipe or the fill level in a tank. In addition to the aforementioned measuring devices and actuators, field devices are also understood to include remote I/O's, radio adapters, or, generally, devices that are arranged on the field level. Field devices can be mounted on tanks or installed in switchgear cabinets or control rooms.

A variety of such field devices is produced and marketed by the Endress+Hauser group.

In modern industrial plants, field devices are often integrated into communication networks. Here, the field device communicates, for example, with higher-level control units and/or with mobile operating tools. Communication between at least one higher-level control unit and the field devices takes place, as a rule, via a bus system, wherein primarily the fieldbus protocols common in automation technology are used, such as, for example, Profibus®, Foundation Fieldbus® or HART®, or Ethernet-based standards such as PROFINET® or EtherNet/IP. Communication can be not only wired, but also wireless. The higher-level control unit is used for process control, for process visualization, for process monitoring and also for starting and operating the field devices and is also referred to as a configuration/management system. For example, information can be retrieved from the field device via an operating tool. Configuration of the field device via an operating tool is also known.

Field devices are also increasingly equipped with Internet interfaces via which communication and/or the energy supply take(s) place. In addition to network accesses such as Ethernet, such field devices are preferably also operated via a mobile operating tool which, when required, communicates with the field device. Bluetooth or WLAN, for example, is used as the communication protocol between the operating unit and the field devices.

Through the various possibilities of communication of the field device with external devices, operation of the field device has become significantly more flexible for the user. The increasing number of functions of the field device places greater demands on the user, since he must know and understand all of the functions in order to set them and be able to operate the field device correctly. At the same time, the use of a plurality of, in particular wireless, communication interfaces also entails the risk of cyber attacks, since persons who do not have authorized access thus have more possibilities of gaining access to the field device from a remote position. Such attacks by external third parties can lead to a loss of data, but also to a disturbance of the ongoing operation of the field device.

In this connection, the International Electrotechnical Commission (IEC) presented a new security guideline in February 2019: IEC 62443-4-2 deals with the security of industrial automation and control systems and thereby focuses on the technical requirements of the systems in question. In this case, not only is the unintentional impairment of ongoing operation to be avoided, but also deliberate impairment by third parties. Four security levels are described in the security guideline, which are intended to reduce potential threats for a field device and to make concrete requirements for the security functions of automation and control systems, such as, for example, the use of time stamps and the support of updates. Each security level is defined by a respective set of stipulated settings of security functions of the field device.

The desired security level can thus be achieved by certain settings of security functions on the field device. However, this calls for the user of the field device to have extensive knowledge in the fields of security levels and IT, which the user usually does not have. However, without this knowledge, it is difficult to set security functions according to the security level, which can lead to incorrect settings at the field device.

SUMMARY

The object of the present disclosure is thus to set the security functions of a field device in a simple and user-friendly manner.

This object is achieved by a method according to the present disclosure for checking the setting of predefined security functions of a field device of process and automation technology, wherein the predefined security functions relate in particular to an access to at least one function of the field device by an unauthorized person. The method involves the following steps:

Determining a security level required at the measuring point and/or at the field device, wherein the stipulated security level defines the target setting of the predefined security functions of the field device, Identifying a user by means of an authentication protocol, Starting a query by the user regarding the actual setting of the security functions of the field device defined at the measuring point, Comparing the actual setting of the predefined security functions of the field device with the target setting of the defined security functions defined by the stipulated security level, Outputting to the user an electronic report about a match or a deviation between the actual setting and the target setting of the predefined security functions of the field device, In the event of the actual setting and the target setting of the predefined security functions of the field device matching, the following step is provided:

Storing the electronic report, or

In the event of the actual setting deviating from the target setting of the predefined security functions of the field device, the following steps are provided:

Performing at least one step for adapting the setting to the intended setting of the predefined security functions of the field device by the user, Repeating the query on the setting of the predefined security functions of the field device by the user.

The great advantage of the method according to the present disclosure is that the user is assisted by the method according to the present disclosure in checking the actual setting of the predefined security functions of the field device. For the application of the method, the user does not need any special know-how with regard to the security requirements to be made of a field device. In addition, the user does not need to check manually the actual setting of the predefined security functions, which reduces errors. The electronic report provides the user with an overview of the actual setting of the predefined security functions of the field device. If the actual setting corresponds to the target setting of the predefined security functions of the field device, the electronic report will be stored. The report can thus also be accessed in the future and the previous actual setting of the predefined security functions of the field device can be compared with the present actual setting. If the actual setting deviates from the target setting of the predefined security functions of the field device, the user has the possibility of adapting the actual setting to the target setting of the predefined security functions of the field device by taking suitable measures and thus achieving the stipulated security level. A new query is then carried out regarding the actual setting of the predefined security functions of the field device in order to check the correct adjustment of the actual setting to the target setting of the predefined security functions of the field device. Ideally, the method according to the present disclosure is used immediately after installation and configuration of the field device. After start-up of the field device, it can thus be ensured that the actual setting of the predefined security functions of the field device corresponds to the stipulated and required security level.

In one embodiment, the method provides for an additional step in the event of the actual setting deviating from the target setting of the predefined security functions of the field device:

Suggestion of at least one measure for the adjustment of the actual setting of at least one predefined security function of the field device to the target setting.

The suggestion of a measure for the adjustment of the actual setting of at least one predefined security function of the field device to the target setting makes precisely that adjustment easier for the user. The user is thus shown what measures he can take in order to reach the stipulated security level of the field device. Here as well, the user needs no special knowledge regarding the security level, but can simply implement the suggested measures.

The predefined security functions of the field device preferably relate in particular to an access to at least one parameter of the field device and/or to a communication of the field device with an external device.

In a further embodiment, reaching or not reaching the stipulated security level is indicated by the electronic report giving the actual setting of the security functions of the field device.

The indication that the stipulated security level of the field device has or has not been reached means that the user does not need to have memorized the target setting of the predefined security functions for the stipulated security level of the field device nor to laboriously compare it with the actual setting of the predefined security functions of the field device.

According to one advantageous development of the method according to the present disclosure, it is provided that there is at least one stipulated security level, wherein each security level is defined independently of the measuring point and the field device, wherein the target setting of the predefined security functions of the field device is defined for security level.

As a rule, there is a plurality of security levels which each defines a target setting of the predefined security functions. The security levels are valid for all field devices. After configuration of the field device, a security level suitable for the field device and/or the measuring point can be selected and by means of the method according to the present disclosure checked and adjusted.

In an additional embodiment, the authentication protocol comprises an input of a password or a check on the user on the basis of at least one biometric characteristic, wherein the user is identified when the password or the biometric characteristic matches previously stored data.

The authentication protocol preferably has a multifactor authentication. In this case, the user is not identified by a single characteristic, such as a password, but by at least two characteristics. This increases the confidence that unauthorized persons are not being granted access erroneously.

In a further embodiment, the measure for adjusting the actual setting of the security functions of the field device relates in particular to a change in the parameters of the field device, wherein the change in the parameters by an unauthenticated user is prevented, or wherein the parameters of the field device are only visible to the authenticated user.

The correct setting of the parameters of the field device is essential for ongoing operation. This is because an erroneous change in the parameters of the field device can severely impair the running process. For this reason, an unintentional change of the parameters of the field device by users or a deliberate erroneous change of the parameters by third parties should therefore be prevented. This can be done, for example, by non-authenticated users having no access to changing parameters or by even authenticated users only being given a right to read parameters but not to change them.

A preferred embodiment provides that the measure for adjusting the actual setting of the security functions of the field device affects at least one communication interface of the field device, wherein the communication interface is switched off.

Switching off the communication interface makes it harder for unauthorized third parties to access the parameters and functions of the field device. At the same time, the user is also prevented from sending information of the field device via the communication interface to an external device which is not authorized to receive the information.

A Bluetooth and/or WLAN and/or Ethernet interface is advantageously used as the communication interface.

In one possible development of the method, the electronic report is output on a display unit of the field device and/or of a control unit which is provided for operating the field device.

In one possible embodiment, the electronic report is stored in the field device and/or in the control unit which is provided for operating the field device.

In a preferred embodiment, the method is carried out in the field device and/or in the control unit which is provided for operating the field device.

BRIEF DESCRIPTION OF THE DRAWING

The method according to the present disclosure will be explained in more detail with reference to FIG. 1 below. The following are shown:

FIG. 1 shows an exemplary embodiment of the method according to the present disclosure.

DETAILED DESCRIPTION

The present method extends to all field devices that collect and/or process-relevant information regardless of whether they are mounted on a tank, in a switchgear cabinet or at another location.

The method according to the present disclosure from FIG. 1 serves to check the setting of predefined security functions (SF1, ..., SFn) of a field device of process and automation technology, wherein the predefined security functions (SF1, ..., SFn) relate in particular to an access to at least one function of the field device by an unauthorized person. The method is carried out in the field device and/or in a control unit which is provided for operating the field device. Without restricting generality, the predefined security functions (SF1, ..., SFn) of the field device relate in particular to an access to at least one parameter of the field device and/or to a communication of the field device with an external device.

In a first step 1, the required security level for the field device and/or the measuring point is defined, wherein the stipulated security level defines the target setting of the predefined security functions (SF1, ..., SFn) of the field device. At least one security level is available for selection, wherein each security level is defined independently of the measuring point and field device and the target setting of the predefined security functions (SF1, ..., SFn) of the field device is defined for each security level. In step 2, a user is identified by means of an authentication protocol. The authentication protocol may provide for requesting a password or a biometric characteristic or even a multifactor authentication, wherein other queries may also be used. In the next step 3, the user starts a query about the actual setting of the security functions (SF1, ..., SFn) of the field device predefined at the measuring point, and the actual setting of the predefined security functions (SF1, ..., SFn) of the field device is then compared with the target setting of the predefined security functions (SF1, ..., SFn) defined by the stipulated security level (step 4). In step 5, the result of the query is then output to the user as an electronic report, wherein a distinction is drawn between a match and a deviation between the actual setting and the target setting of the predefined security functions (SF1, ..., SFn) of the field device. In addition, the reaching or not reaching of the stipulated security level by the actual setting of the security functions (SF1, ..., SFn) of the field device can optionally be indicated in the electronic report.

In the event of the actual setting and the target setting of the predefined security functions (SF1, ..., SFn) of the field device matching, the electronic report is stored in step 6. The electronic report can be output and/or stored in the field device itself or the control unit. Output and storage of the electronic report is here not limited to the specified devices.

If the actual setting deviates from the target setting of the predefined security functions (SF1, ..., SFn) of the field device, at least one measure will be suggested for adjusting the actual setting of at least one predefined security function (SF1, ..., SFn) of the field device to the target setting (step 7). In step 8, the user then performs at least one of the measures suggested in step 7. A new query about the actual setting of the predefined security functions (SF1, ..., SFn) of the field device is then started by the user (step 3).

The measures suggested in step 7 may relate, for example, to a change in the parameters of the field device. As a measure, changing parameters by an unauthenticated user may be disabled, or the authenticated user may only be allowed to read the parameters of the field device. Another measure may relate to at least one communication interface of the field device, wherein the communication interface is switched off. A communication interface affected thereby may be a Bluetooth and/or WLAN and/or Ethernet interface, wherein further possibilities are not excluded.

The invention claimed is:

1. A method for checking a setting of predefined security functions of a field device in process and automation technology, wherein the predefined security functions relate to an access to at least one function of the field device by an unauthorized person, the method comprising:
    determining a stipulated security level at a measuring point and at the field device and providing the stipulated security level to the field device, wherein the stipulated security level defines a target setting of the predefined security functions of the field device;
    identifying a user via an authentication protocol;
    starting a query in the field device by the user regarding an actual setting of the predefined security functions of the field device at the measuring point;
    comparing in the field device the actual setting of the predefined security functions with the target setting of the predefined security functions defined by the stipulated security level;
    outputting to the user an electronic report about a match or deviation between the actual setting and the target setting of the predefined security functions of the field device;
    storing the electronic report when the actual setting of the predefined security functions matches the target setting of the predefined security functions;
    performing at least one step for adapting the actual setting to the target setting of the predefined security functions of the field device by the user when the actual setting of the predefined security functions deviates from the target setting of the predefined security functions, wherein the at least one step includes suggesting at least one measure for adjusting the actual setting of the predefined security functions to the target setting of the predefined security functions; and
    repeating the query on the setting of the predefined security functions of the field device by the user.

2. The method according to claim 1, wherein the predefined security functions of the field device relate to an access to at least one parameter of the field device and/or to a communication of the field device with an external device.

3. The method according to claim 1, wherein reaching or not reaching the stipulated security level by the actual setting of the security functions of the field device is indicated in the electronic report.

4. The method according to claim 1, wherein there is at least one stipulated security level, wherein each security level is defined independently of the measurement point and field device, wherein the target setting of the predefined security functions of the field device is defined for each security level.

5. The method according to claim 1, wherein the authentication protocol includes an input of a password or a check on the user on the basis of at least one biometric characteristic, wherein the user is identified when the password or the biometric characteristic matches previously stored data.

6. The method according to claim 1, wherein the at least one measure for adjusting the actual setting of the predefined security functions of the field device relates to a change in the parameters of the field device, wherein the change in the parameters by an unauthenticated user is prevented, or wherein the parameters of the field device are only visible to the authenticated user.

7. The method according to claim 1, wherein the at least one measure for adjusting the actual setting of the predefined security functions of the field device relates to at least one communication interface of the field device, wherein the communication interface is switched off.

8. The method according to claim 1, wherein the electronic report is output on a display unit of the field device and/or of a control unit which is provided for operating the field device.

9. The method according to claim 1, wherein the electronic report is stored in the field device and/or in the control unit which is provided for operating the field device.

10. The method according to claim 1, wherein the method is carried out in the field device and/or in a control unit which is provided for operating the field device.

11. The method according to claim 5, wherein the authentication protocol includes a multifactor authentication.

12. The method according to claim 7, wherein a Bluetooth and/or WLAN and/or Ethernet interface is used as the communication interface.

\* \* \* \* \*